United States Patent

Ishii

[11] Patent Number: 5,821,899
[45] Date of Patent: Oct. 13, 1998

[54] METHOD OF DETERMINING THE INTEGRAL WAVE PHASE IN A GEODETIC INTERFEROMETRY METHOD

[75] Inventor: Hiroshi Ishii, Kanagawa, Japan

[73] Assignee: Sokkia Company Limited, Tokyo, Japan

[21] Appl. No.: 686,548

[22] Filed: Jul. 26, 1996

[30] Foreign Application Priority Data

Sep. 14, 1995 [JP] Japan .................................... 7-236511

[51] Int. Cl.⁶ ........................................................ G01S 5/02
[52] U.S. Cl. ............................................ 342/357; 342/442
[58] Field of Search .................................. 342/357, 419, 342/442, 156, 424

[56] References Cited

U.S. PATENT DOCUMENTS

| | | | |
|---|---|---|---|
| 4,638,320 | 1/1987 | Eggert et al. | 342/442 |
| 5,010,343 | 4/1991 | Anderson | 342/432 |
| 5,185,610 | 2/1993 | Ward et al. | 342/357 |
| 5,359,332 | 10/1994 | Allison et al. | 342/357 |
| 5,471,218 | 11/1995 | Talbot et al. | 342/357 |

*Primary Examiner*—Thomas H. Tarcza
*Assistant Examiner*—Dao L. Phan
*Attorney, Agent, or Firm*—Sixbey Friedman Leedom & Ferguson; Thomas W. Cole

[57] ABSTRACT

In a geodetic interferometry method, a pair of GPS antennae are set at a fixed known point and an unknown point and radio signals transmitted from a plurality of satellites are received at the same time with the GPS antennae to determine the distance and bearing between the known point and the unknown point. In this process, the GPS antenna at the unknown point is sequentially set at two positions which are equidistant and 180° opposite each other with respect to the GPS antenna set at the known point and the integral wave phase is determined from the radio signals received from the satellites at these two positions.

5 Claims, 1 Drawing Sheet

Unknown point (R) at time t

Unknown point (R) at time t

Unknown point (R) at time t'

METHOD OF DETERMINING THE INTEGRAL WAVE PHASE IN A GEODETIC INTERFEROMETRY METHOD

BACKGROUND OF THE INVENTION

The present invention relates to a method of determining the integral wave phase in the geodetic interferometry method.

Various surveying methods using GPS systems are known. Among such types of surveying methods is the geodetic interferometry method in which radio waves transmitted from a plurality (four or more) of satellites are received at the same time by a plurality of GPS receivers. The phase difference of the radio waves received by the CPS receivers is calculated to measure the distance and bearing between points on the Earth.

The unknown quantity other than the coordinate values of the unknown point in the surveying by the geodetic interferometry method is the integral wave phase included in the double difference of the carrier wave phases of the GPS satellites. This integral wave phase must therefore be determined by some method in order to determine the positional coordinates of the unknown point.

Conventionally, either (1) a method comprising the step of setting GPS receivers respectively at the known point and the unknown point, receiving radio waves from satellites for approximately one hour, and determining the integral wave phase from the information obtained from receiving such radio waves, or (2) the so-called antenna swapping method, comprising the steps of receiving the radio waves from satellites upon exchanging the GPS antennae of the GPS receivers as they are and determining the integral wave phase from the information obtained by receiving such radio waves, is used.

However, such prior art methods for determining the integral wave phase had the technical problem described below.

That is, since the two above-mentioned prior art methods for determining the integral wave phase use the movement of the satellites, they require a large amount of time for data collection or require troublesome operations such as exchanging antennae as they are.

SUMMARY OF THE INVENTION

The present invention has been made in view of such a problem of the prior art, and it is therefore a primary object of the invention to provide a geodetic interferometry method by which the integral wave phase can be determined without spending a large amount of time for data collection or having to perform troublesome operations.

In order to achieve the above-mentioned object, the present invention comprises the steps of positioning a pair of GPS antennae at a fixed known point and an unknown point and receiving radio signals transmitted from a plurality of satellites with the GPS antennae at the same time to determine the distance and bearing between the known point and unknown point and receiving radio signals transmitted from a plurality of satellites with the GPS antennae at the same time to determine the distance and bearing between the known point and unknown point, determining the integral wave phase by sequentially positioning the GPS antenna of the unknown point at two positions which are equidistance and 180° opposite each other with respect to the other GPS antenna positioned at the known point, and determining the integral wave phase based on the radio signals received at these two positions from the satellites.

If the GPS antenna of the unknown position is sequentially positioned at two positions which are equidistant and 180° opposite each other with respect to the other GPS antenna positioned at the known point, the vectors pointing from the antenna at the known point to the other antenna will be exactly opposite in direction for the two positions.

If the radio signals from the satellites are not interrupted during this process, the same integral wave phase quantity will be included in the double difference of the carrier wave phase obtained at such exactly opposite positions. Therefore, when the double differences at the two positions are summed together, one would be left with a quantity that is twice the integral wave phase quantity and the integral wave phase can be determined by dividing the sum by two and determining the closest integer to the division result.

As was described above by the method of determining the integral wave phase in a geodetic interferometry method according to the present invention, there is such an advantage that the integral wave phase can be determined readily without performing troublesome operations or selecting specific observation points.

BRIEF DESCRIPTION OF THE DRAWINGS

In order that the method in which the above-recited objects and features of the invention are achieved can be understood in detail, a more particular description of the invention will now be made by reference to a specific embodiment thereof which is illustrated in the accompanying drawings, which drawings form a part of this specification.

DESCRIPTION OF A PREFERRED EMBODIMENT OF THE INVENTION

Figure 1A:
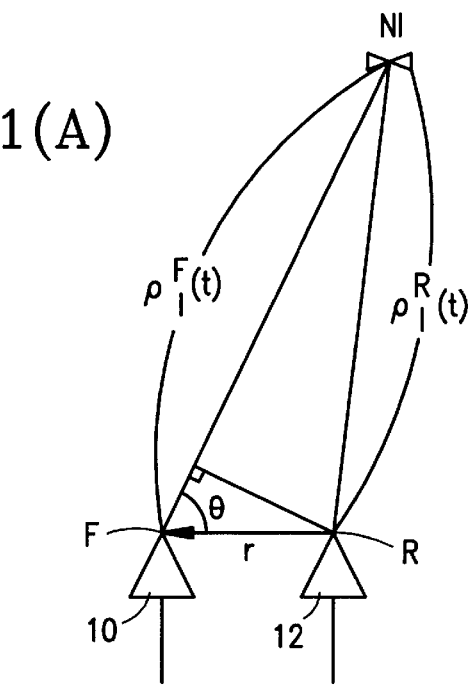
FIG. 1(A) is a diagram which explains the principles of the method according to the present invention of determining the integral wave phase with a geodetic interferometer.
Figure 1B:
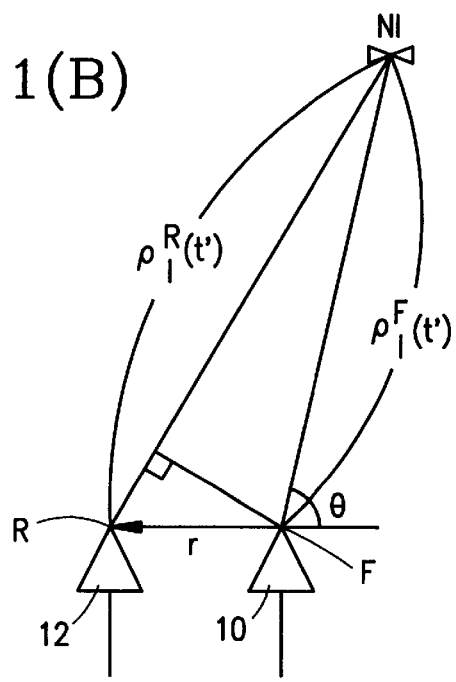

A preferred embodiment for carrying out the present invention shall now be described with reference to the drawings. FIG. 1 shows a mode of carrying out the method according to the invention for determining the integral wave phase in the geodetic interferometry method. In this type of geopositioning, surveying is ordinarily performed by receiving radio signals transmitted from four satellites. However, for the sake of convenience, the condition where radio signals are received from only one satellite is shown in FIG. 1(A) and FIG. 1(B).

Two receivers are prepared for receiving the radio signals transmitted from the satellite and one of the GPS antenna 10 is set at a known fixed point (F) while the other GPS antenna 12 is positioned at an unknown point (R) separated by the distance (r). Here, the distance ($\rho$) from the satellite to the antennae 10 and 12 in the geodetic interferometry method is given by the following general formula:

$$\rho = N \cdot \lambda + (\emptyset + \Delta) \quad (a)$$

Here N is the number of carrier waves observed at the GPS receiver, $\lambda$ is the wavelength of the carrier waves, $\Phi$ is the phase difference of the carrier waves, and in $\Delta$ are included the errors due to the receivers, the errors caused by the ionosphere when radio waves propagate in air, and the integral wave phase included in the double difference of the carrier wave phases of the GPS satellite.

If it is assumed, as shown in FIG. 1(A), that radio signals are simultaneously received by the fixed antenna 10(F) and the unknown antenna 12(R) at a time t from satellites $N_1$ and $N_j$, the following equations hold at the fixed antenna 10(F):

$$\rho^F i(t) = N_i \lambda + \{\emptyset^F i(t) + \Delta\} \quad (b)$$

$$\rho^F j(t) = N_j \lambda + \{\emptyset^F j(t) + \Delta\} \quad (c)$$

Furthermore, the following equations hold at the unknown antenna side 12(R):

$$\rho^R i(t) = N_i \lambda + \{\emptyset^R i(t) + \Delta\} \quad (d)$$

$$\rho^R j(t) = N_j \lambda + \{\emptyset^R j(t) + \Delta\} \quad (e)$$

Since the errors due to the receivers and the errors caused by the ionosphere when radio waves propagate through air are included in equations (b) to (e), when equation (c) is subtracted from equation (b) and equation (e) is subtracted from equation (d), these errors are cancelled out and only the integral wave phase included in the double difference of the carrier wave phases of the GPS satellites remain in $\Delta$. Furthermore, the following results is obtained by determining ((b)-(c))-((d)-(e)):

$$\rho^F i(t) - \rho^R i(t) - \rho^F j(t) + \rho^R j(t) = \emptyset^F i(t) - \emptyset^R i(t) - \emptyset^F j(t) + \emptyset^R j(t) + N_{ij} \quad (f)$$

Here, $N_{ij}$ shall be the integral wave phase quantity included in the double difference of the carrier wave phases.

Likewise, the following equation will hold when antenna 12 of the unknown point is moved from the condition shown in FIG. 1(A) and set as shown in FIG. 1(B) at a position, that is a distance r away from antenna 10 and opposite, in other words rotated by 180°, with respect to the position shown in FIG. 1(A), and radio signals are received from the same satellites at a time t':

$$\rho^F i(t') - \rho^R i(t') - \rho^F j(t') + \rho^R J(t') = \emptyset^F i(t') - \emptyset^R i(t') - \emptyset^F j(t') + \emptyset^R j(t') + N_{ij} \quad (g)$$

Here, the following equations will hold if the elevation angle of the satellite is $\theta$:

$$\rho^R i(t) = \rho^F i(t) - r\cos\theta_i(t) \quad (h)$$

$$\rho^R j(t) = \rho^F j(t) - r\cos\theta_j(t) \quad (i)$$

$$\rho^R i(t') = \rho^F i(t') - r\cos\theta_i(t') \quad (j)$$

$$\rho^R j(t') = \rho^F j(t') - r\cos\theta_j(t') \quad (k)$$

When equations (h) to (k) are substituted into equations (f) and (g), the following is obtained:

$$r\cos\Theta_i(t') - r\cos\Theta_j(t) = d\emptyset^{FR}_{ij}(t) + N_{ij} \quad (l)$$

$$-r\cos\Theta i(t') + r\cos\Theta_j(t') = d\emptyset^{FR}_{ij}(t') + N_{ij} \quad (m)$$

Here, $d\emptyset^{FR}_{ij}(t) = \emptyset^F_i(t) - \emptyset^R_i(t) - \emptyset^F_j(t) + \emptyset^R_j(t)$, $d\emptyset^{FR}_{ij}(t') = \emptyset^F_i(t'1) - \emptyset^R_i(t') - \emptyset^F_j(t') + \emptyset^R_j(t')$ If the time difference between time t and time t' is small, the approximations, $\cos\Theta_i(t) \approx \cos\Theta_i(t')$, $\cos\Theta_j(t) \approx \cos\Theta_j(t')$, will hold.

When the above approximations are applied upon determining equations (1) and (m), $d\emptyset^{FR}_{ij}(t) + N_{ij} + d\emptyset^{FR}_{ij}(t') + N_{ij} = 0$. Since this may be modified to read $N_{ij} = -\frac{1}{2}\{d\emptyset^{FR}_{ij}(t) + d\emptyset^{FR}_{ij}(t')\}$ and since $d\emptyset^{FR}_{ij}(t)$ and $d\emptyset^{FR}_{ij}(t')$ can be determined from observations using GPS antennae 10 and 12 and it is known that the integral wave phase quantity $N_{ij}$ is an integer, the integral wave phase quantity $N_{ij}$ may be determined by determining the nearest integer from the values determined from observation.

With the determination of the integral wave phase quantity $N_{ij}$ using the above method, there is no need to collect data over a long period of time or to carry out the troublesome procedure of exchanging antennae as in the prior art methods of determination.

The above mode for carrying out the invention demonstrates a case where the integral wave phase was determined upon separating the GPS antenna 12 at the unknown point from a GPS antenna 10 at a known point by distance r. However, since this distance r can take on any length as long as it remains constant, if, for example, the GPS antennae are circular and the antenna 12 is set to positions that are rotated by 180° with respect to antenna 10, the value of r will be the diameter of antenna 10. Thus, by priority determining the diameter of the antenna, opposing positions of equal distance can be specified and the integral wave phase can be determined without measuring the distance r.

What is claimed:

1. An improved geodetic interferometry method including the steps of setting a pair of GPS antennae at a fixed known point and an unknown point, respectively, and receiving L1 band radio signals transmitted from at least one satellite with the GPS antennae at the same time to determine the distance and bearing between the known point and the unknown point, wherein the improvement comprises determining the integral wave phase by the steps of:
sequentially positioning the GPS antenna of the unknown point at two locations which are equidistant a distance r and 180° opposite each other with respect to the other GPS antenna that is positioned at the known point, and
determining the integral wave phase based on the L1 band radio signals received at the two 180° opposite positions from the satellite in a manner that is independent of the length of distance r.

2. The improved method of claim 1, wherein said step of determining the integral wave phase is implemented solely by determining an angle of elevation $\ominus$ of said satellite with respect to said GPS antennae located at said fixed point and determining phase differences in said L1 band radio signals received by said pair of GPS antennae at nearly simultaneous times t and t¹.

3. The improved method of claim 1, wherein said L1 band radio signals are transmitted and received continuously during said sequential positioning.

4. The improved method of claim 1, wherein said integral wave phase is determined by doubling the difference in a carrier wave phase of said L1 band signals at both of said two locations, summing said double differences together, and then dividing the resulting sum by two.

5. The improved method of claim 1, wherein both the GPS antennae are circular, and including the step of determining the diameter of said antennae prior to said sequential positioning step.

* * * * *